(12) United States Patent
Nishikawa

(10) Patent No.: US 9,001,906 B2
(45) Date of Patent: Apr. 7, 2015

(54) COMMUNICATION APPARATUS AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 176 days.

(21) Appl. No.: 13/674,500

(22) Filed: Nov. 12, 2012

(65) Prior Publication Data

US 2013/0202060 A1    Aug. 8, 2013

(30) Foreign Application Priority Data

Feb. 3, 2012    (JP) ................................. 2012-022108

(51) Int. Cl.

| H04L 27/28 | (2006.01) |
|---|---|
| H04L 25/49 | (2006.01) |
| H04L 27/26 | (2006.01) |
| H04J 1/00  | (2006.01) |
| H04L 27/04 | (2006.01) |
| H04L 27/06 | (2006.01) |

(52) U.S. Cl.
CPC ................ *H04L 27/04* (2013.01); *H04L 27/06* (2013.01); *H04L 27/2614* (2013.01)

(58) Field of Classification Search
CPC ...... H04L 27/04; H04L 27/06; H04L 27/2614
USPC .......... 375/260, 295, 296, 297, 285; 370/203, 370/208, 210
See application file for complete search history.

(56) References Cited

U.S. PATENT DOCUMENTS

| 6,983,026 B2 * | 1/2006 | Pinckley et al. ............... 375/296 |
| 2004/0021516 A1 * | 2/2004 | Oishi et al. .................... 330/149 |

(Continued)

FOREIGN PATENT DOCUMENTS

| JP | 2008-340361 A | 12/1996 |
| JP | 2006-165781 | 6/2006 |
| WO | 2011086696 A1 | 7/2011 |

OTHER PUBLICATIONS

Ryu et al., "A New PAPR Reduction Scheme: SPW (Subblock Phase Weighting," IEEE 2002, pp. 81-88.*

(Continued)

*Primary Examiner* — Tesfaldet Bocure
(74) *Attorney, Agent, or Firm* — Warner Norcross & Judd LLP

(57) ABSTRACT

A modulator generates a modulation signal from an input signal, and a serial-parallel converter generates a subcarrier modulation signal from the modulation signal. An IFFT unit performs an inverse fast Fourier transformation on the subcarrier modulation signal to generate first data. An operator multiplies respective elements of the first data by amplitude coefficients, and further adds dispersion coefficients to the multiplication result, the amplitude coefficients being real numbers other than 0 defined for the respective elements, at least one of the amplitude coefficients having a value other than 1, the dispersion coefficients being complex numbers defined for the respective components, and at least one of the dispersion coefficients having a value other than 0. Then, data symbols are generated based on a calculation result. A transmitter transmits a transmission frame including the data symbols to another apparatus via an antenna.

11 Claims, 11 Drawing Sheets

(56) References Cited

U.S. PATENT DOCUMENTS

2011/0255870 A1* 10/2011 Grigoryan et al. .............. 398/65
2013/0136449 A1* 5/2013 Liu et al. ......................... 398/65

OTHER PUBLICATIONS

Varahram et al., "A Low Complexity Partial Transmit Sequence Scheme by Use of Dummy signals for PAPR Reduction in OFDM System," IEEE 2010. pp. 2416-2420.*

English language abstract and machine assisted translation for JP 2008/340361, extracted from www.ipld.inpitgo.jp on Feb. 9, 2015, 9 pages.

English language abstract and machine assisted translation for WO 2011/086696, extracted from www.espacenet.com, 19 pages.

A New Weighting Factor of PTS OFDM With Low Complexity for PAPR Reduction, Electrical Engineering/Electronics, Computer, Telecommunications and Information Technology, 2009.ECTI-CON 2009. 6th International Conference on May 9, 2009.

PAPR Reduction of OFDM Signals Using Autocorrelation Based SLM Without Side Information, Electrical and Computer Engineering, 2008. CCECE 2008. Canadian Conference on May 7, 2008, pp. 71-76.

English translation of Japan Office Action, dated Jan. 27, 2015, 3 pages.

* cited by examiner

COMMUNICATION APPARATUS AND COMMUNICATION METHOD

CROSS-REFERENCE TO RELATED APPLICATION

This application claims the benefit of Japanese Patent Application No. 2012-022108, filed on Feb. 3, 2012, the entire disclosure of which is incorporated by reference herein.

FIELD

This application relates to a communication apparatus and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR. In addition, the technique disclosed in Unexamined Japanese Patent Application KOKAI Publication No. 2006-165781 cannot control the degree of reduction in PAPR.

SUMMARY

Accordingly, it is an object of the present invention to reduce the PAPR in OFDM communication, and control the degree of reduction in PAPR.

To achieve the object, according to a first aspect of the invention, there is provided a communication apparatus for communicating with another apparatus in orthogonal frequency-division multiplexing wireless communication, the communication apparatus comprising:

a modulator that modulates an input signal using a predetermined modulation scheme, and assigns the modulated input signal to subcarriers with frequency components orthogonal to each other, thereby generating a subcarrier modulation signal;

a first transformer that performs an inverse fast Fourier transformation on the subcarrier modulation signal to generate first data;

an operator that multiplies respective elements of the first data by amplitude coefficients, and that further adds dispersion coefficients to the multiplication result, the amplitude coefficients being real numbers other than 0 defined for the respective elements, at least one of the amplitude coefficients having a value other than 1, the dispersion coefficients being complex numbers defined for the respective elements, and at least one of the dispersion coefficients having a value other than 0;

a synthesizer that generates data symbols based on an operation result by the operator; and a transmitter that transmits a transmission frame including the data symbols.

It is preferable that the first data may include a plurality pieces of subdata which includes a plurality of elements continuously located in the first data, and the operator may multiply the plurality of elements included in each of the plurality pieces of subdata by the amplitude coefficients which have a same value respectively, and may add the dispersion coefficients which have a same value to the multiplication result.

It is preferable that each of the plurality pieces of subdata may include a same number of elements, and the dispersion coefficients may be expressed by a sine wave, which has a predetermined amplitude value and a phase of which is a value obtained by dividing one cycle of the sine wave by a number of the plurality pieces of subdata and multiplying the result by a number indicating each of the plurality pieces of subdata.

It is preferable that the communication apparatus may further comprise:

a shifter that, in cases where a predetermined number of continuous input signals are predetermined identical signals in which each element of a subcarrier modulation signal generated from each of the predetermined number of input signals is a same value, applies a data shift to a plurality pieces of first data generated from the predetermined number of input signals so that elements each of which has a maximum amplitude in each of the plurality pieces of first data are included in different subdata among the plurality pieces of first data, wherein the operator multiplies the plurality of elements, which are included in each of the plurality pieces of subdata included in each of the plurality pieces of first data which is shifted by the shifter, by the amplitude coefficients which have a same value respectively, and adds the dispersion coefficients which have a same value to the multiplication result, the synthesizer generates data symbols based on an operation result by the operator, and the transmitter transmits a transmission frame including the data symbols in a predetermined position.

According to a second aspect of the invention, there is provided a communication apparatus for communicating with another apparatus in orthogonal frequency-division multiplexing wireless communication, the communication apparatus comprising:

a receiver that receives a transmission frame including data symbols;

a serial-parallel converter that performs serial-parallel conversion on the data symbols to generate a parallel signal;

an inverse operator that subtracts, from respective elements of the parallel signal, dispersion coefficients which are complex numbers defined for the respective elements, and divides the result by amplitude coefficients which are real numbers defined for the respective elements;

a second transformer that performs a fast Fourier transformation on an operation result by the inverse operator to generate a subcarrier modulation signal; and a demodulator that demodulates the subcarrier modulation signal by a predetermined demodulation scheme.

It is preferable that the parallel signal may include a plurality pieces of subdata which includes a plurality of elements continuously located in the parallel signal, and the inverse operator may subtract the dispersion coefficients which have a same value from the plurality of elements included in each of the plurality pieces of subdata respectively, and may divide the subtraction result by the amplitude coefficients which have a same value.

It is preferable that each of the plurality pieces of subdata may include a same number of elements, and the dispersion coefficients may be expressed by a sine wave, which has a predetermined amplitude value and a phase of which is a value obtained by dividing one cycle of the sine wave by a number of the plurality pieces of subdata and multiplying the result by a number indicating each of the plurality pieces of subdata.

It is preferable that the communication apparatus may further comprises:

a first detector that selects, based on a signal point arrangement of the parallel signal generated from the data symbol located on a predetermined position in the transmission frame, a signal point arrangement corresponding to the signal point arrangement of the parallel signal from predetermined signal point arrangements, detects an amplitude coefficient and a dispersion coefficient which are defined for a signal point corresponding to each element of parallel signal generated from data symbols located on positions other than the predetermined position in the transmission frame among signal points in the selected signal point arrangement, and defines the detected amplitude coefficient and dispersion coefficient for the each element, wherein the inverse operator subtracts, from each element of the parallel signal, the dispersion coefficient which is detected and defined for the each element by the first detector, and divides the result by the amplitude coefficient which is detected and defined for the each element by the first detector.

It is preferable that the receiver may receive the transmission frame which includes data symbols in a predetermined position, the data symbols being generated by shifting a plurality pieces of first data by a predetermined number of times which are different in each first data, each of the plurality pieces of first data being generated by performing an inverse fast Fourier transformation on a subcarrier modulation signal each element of which has a same value, and by applying a predetermined operation, the communication apparatus may further comprise:

a second detector that detects, among signal points on a complex plane corresponding to elements of a predetermined number of parallel signals generated from the data symbols located on the predetermined position in the transmission frame, an amplitude coefficient based on a distance between an equivalent signal point which is located on a same position in the predetermined number of parallel signals and a signal point corresponding to the equivalent signal point among signal points which are located on different positions in the predetermined number of parallel signals, detects a dispersion coefficient based on a complex number which represents a difference between the equivalent signal point and an origin on the complex plane, and defines the detected amplitude coefficient and dispersion coefficient for each element of subdata corresponding to the equivalent signal point among the plurality pieces of subdata included in parallel signals generated from data symbols located on positions other than the predetermined position in the transmission frame;

wherein the inverse operator subtracts, from each element of the parallel signals, the dispersion coefficient which is detected and defined for the each element by the second detector, and divides the result by the amplitude coefficient which is detected and defined for the each element by the second detector.

According to a third aspect of the invention, there is provided a communication method that is executed by a communication apparatus communicating with another apparatus in orthogonal frequency-division multiplexing wireless communication, the communication method comprising:

a modulating step of modulating an input signal using a predetermined modulation scheme, and assigning the modulated input signal to subcarriers with frequency components orthogonal to each other, thereby generating a subcarrier modulation signal;

a first transformation step of performing an inverse fast Fourier transformation on the subcarrier modulation signal to generate first data;

an operation step of multiplying respective elements of the first data by amplitude coefficients, and further adding dispersion coefficients to the multiplication result, the amplitude coefficients being real numbers other than 0 defined for the respective elements, at least one of the amplitude coefficients having a value other than 1, the dispersion coefficients being complex numbers defined for the respective elements, and at least one of the dispersion coefficients having a value other than 0;

a synthesis step of generating data symbols based on an operation result by the operation step; and a transmission step of transmitting a transmission frame including the data symbols.

According to a fourth aspect of the invention, there is provided a communication method that is executed by a communication apparatus communicating with another apparatus in orthogonal frequency-division multiplexing wireless communication, the communication method comprising:

a receiving step of receiving a transmission frame including data symbols;

a serial-parallel conversion step of performing serial-parallel conversion on the data symbols to generate a parallel signal;

an inverse operation step of subtracting, from respective elements of the parallel signal, dispersion coefficients which are complex numbers defined for the respective elements, and dividing the result by amplitude coefficients which are real numbers defined for the respective elements;

a second transformation step of performing a fast Fourier transformation on an operation result by the inverse operation step to generate a subcarrier modulation signal; and a demodulation step of demodulating the subcarrier modulation signal by a predetermined demodulation scheme.

According to the invention, it is possible to reduce the PAPR in OFDM communication, and further control the degree of reduction in PAPR.

BRIEF DESCRIPTION OF THE DRAWINGS

A more complete understanding of this application can be obtained when the following detailed description is considered in conjunction with the following drawings, in which.

DETAILED DESCRIPTION

Figure 1:
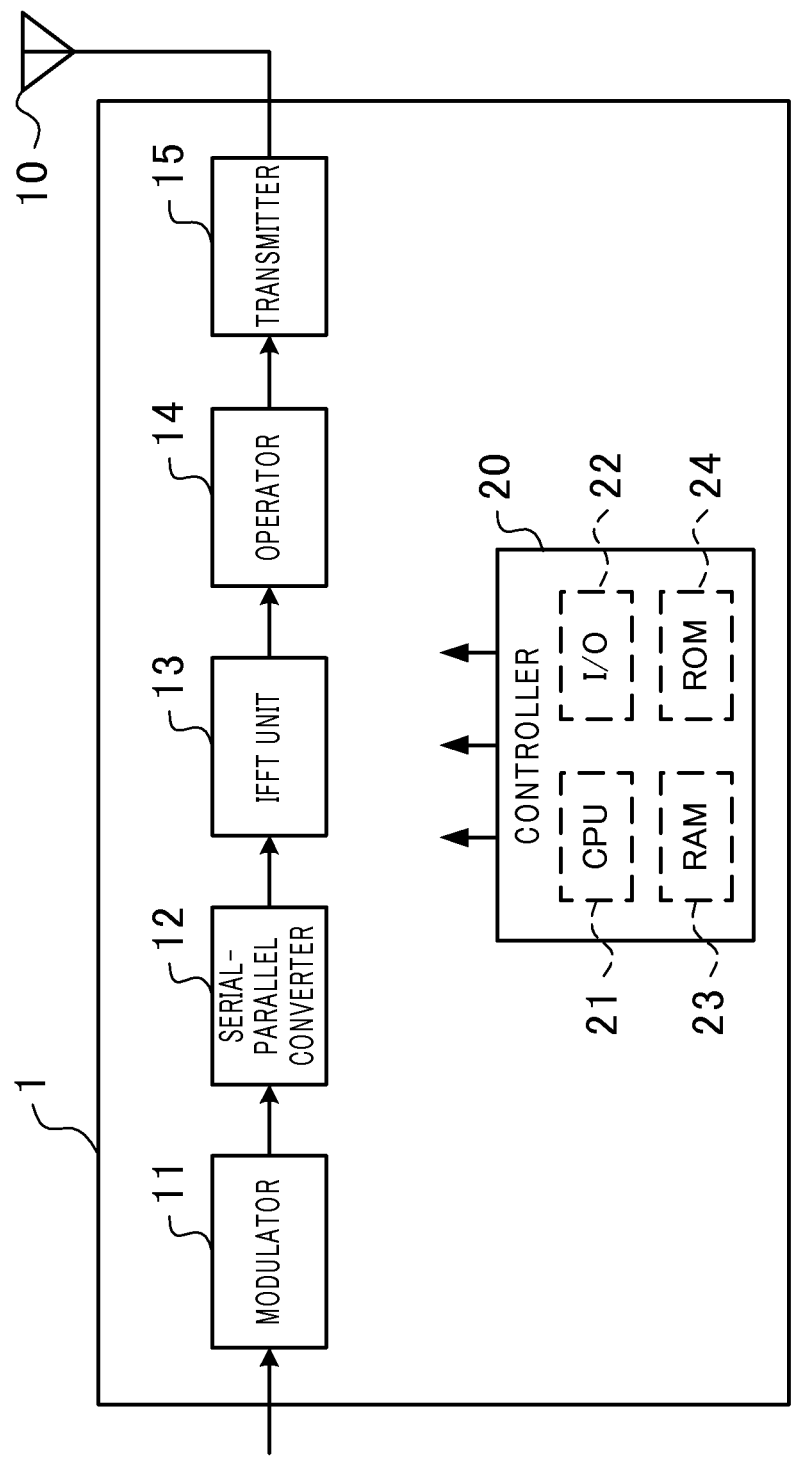
FIG. 1 is a block diagram illustrating a configuration example of a communication apparatus according to a first embodiment of the invention.

An exemplary embodiment of the invention will be described in detail hereinbelow with reference to the accompanying drawings Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform an IDFT instead of an IFFT Likewise, an FFT (Fast Fourier Transformation) is a concept including both FFT and DFT (Discrete Fourier Transformation) hereinafter. When an IDFT and a DFT are carried out, an FFT size means the size of a DFT hereinafter.

First Embodiment

FIG. 1 is a block diagram illustrating a configuration example of a communication apparatus according to a first embodiment of the invention. The communication apparatus 1 communicates with another apparatus in OFDM (Orthogonal Frequency-Division Multiplexing) wireless communication. The communication apparatus 1 includes an antenna 10, a modulator 11, a serial-parallel converter 12, an IFFT unit 13, an operator 14, a transmitter 15, and a controller 20.

The controller 20 includes a CPU (Central Processing Unit) 21, a RAM (Random Access Memory) 23, and a ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
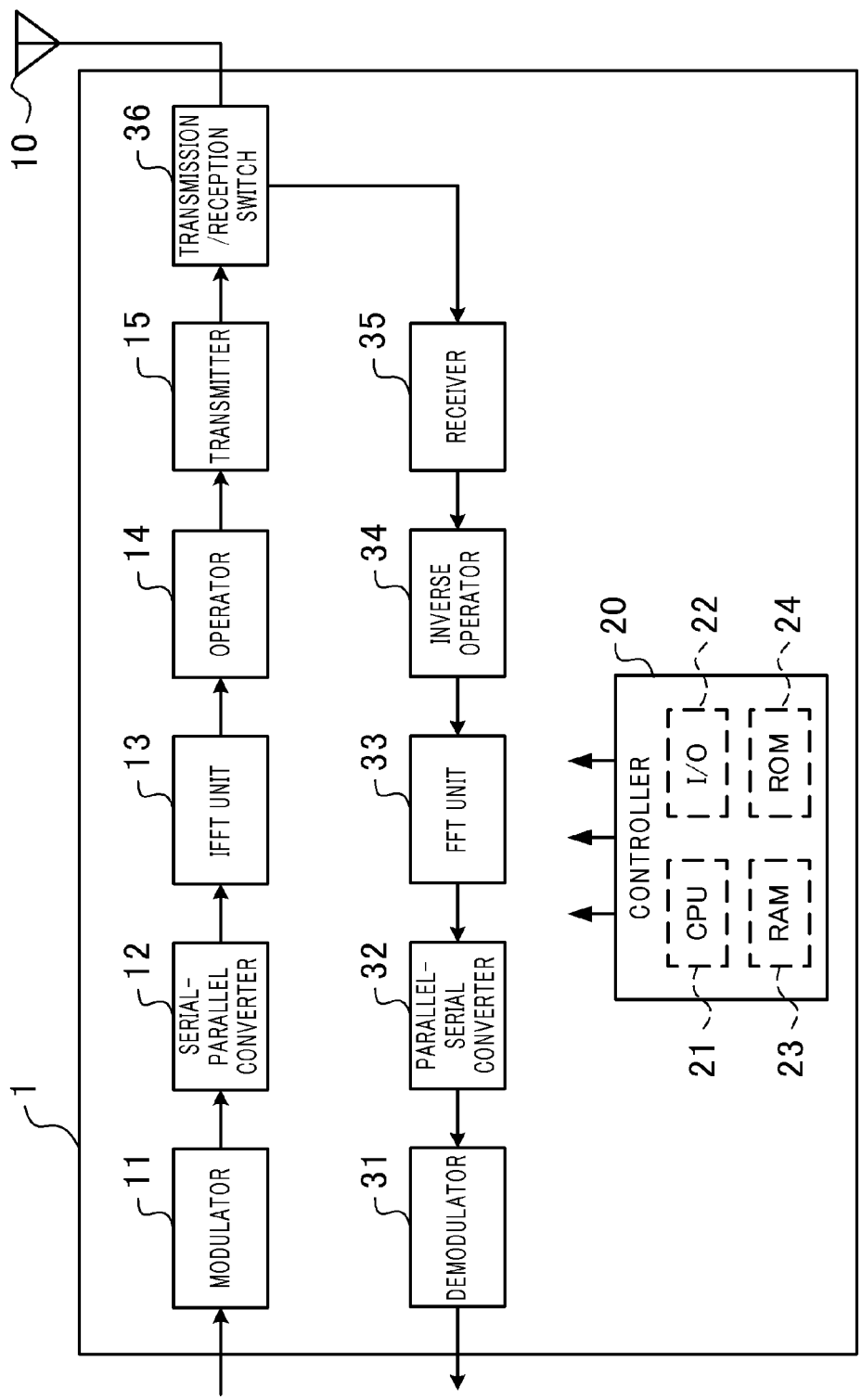
FIG. 2 is a block diagram illustrating a different configuration example of the communication apparatus according to the first embodiment.

FIG. 2 is a block diagram illustrating a different configuration example of the communication apparatus according to the first embodiment. To provide the communication apparatus 1 with a reception function, the communication apparatus 1 shown in FIG. 2 further includes a demodulator 31, a parallel-serial converter 32, an FFT unit 33, an inverse operator 34, a receiver 35, and a transmission/reception switch 36.

Referring to the communication apparatus 1 shown in FIG. 2 which has the transmission function and the reception function, a communication method which is carried out by the communication apparatus 1 will be described hereinbelow.

The modulator 11 modulates an input signal by a predetermined modulation scheme, to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signal to the IFFT unit 13. The IFFT unit 13 performs an IFFT on the subcarrier modulation signal to generate first data, and sends the generated first data to the operator 14.

The operator 14 multiplies respective elements of the first data by amplitude coefficients, and further adds dispersion coefficients to the multiplication result. The amplitude coefficients are real numbers other than 0 defined for the respective elements, and at least one of the amplitude coefficients has a value other than 1. The dispersion coefficients are complex numbers defined for the respective elements, and at least one of the dispersion coefficients has a value other than 0. The amplitude coefficients and the dispersion coefficients are defined beforehand in consideration of the degree of reduction in PAPR (Peak-to-Average Power Ratio), and the degree of deterioration of BER (Bit Error Rate), as described later.

The amplitude coefficients and the dispersion coefficients may have different values respectively for each element, and may have the same values respectively for each element. The first data may be constituted so as to include a plurality pieces of subdata which includes a predetermined number of elements continuously located in the first data, and the operator 14 may be constituted so as to, with respect to arbitrary subdata, multiply each element included in the subdata by the same amplitude coefficient, and to add the same dispersion coefficient to the multiplication result. Furthermore, the elements included in each subdata may differ in number, and may be the same in number.

It is possible to suppress the variation in amplitude between elements after the operation and to reduce the PAPR, by constituting that the number of the elements included in each subdata is made to differ, and for example, for an element of which amplitude exceeds a predetermined value among the elements of the first data, the amplitude coefficient thereof is made small in comparison with other elements, and for an element of which amplitude is lower than the predetermined value, the amplitude coefficient thereof is made large in comparison with other elements.

Moreover, in cases where each subdata is made to include the same number of elements, it is possible to realize the above-described operation by a single operation unit. It may be constituted so that each subdata includes the same number of elements, and the dispersion coefficients are expressed by a sine wave, which has a predetermined amplitude value and a phase of which is a value obtained by dividing the one cycle of the sine wave by the number of the plurality pieces of subdata and multiplying the result by a number indicating each of the plurality pieces of subdata. Such constitution causes each point in the drawing of the signal point arrangement of data which is applied in the above-described calculation to the first data as described later to approach on the circumference of the circle of which middle point is the origin, and allows a reduction of PAPR.

For example, when the FFT size is set to N, the first data u is represented by following equation (1).

[Eq. 1]

$$u = \begin{bmatrix} u_1 \\ u_2 \\ u_3 \\ \vdots \\ u_N \end{bmatrix} \quad (1)$$

For example, if the number of pieces of subdata is expressed by d, the number of elements included in each subdata is set to 2, an amplitude coefficient used for the calculation for elements of the k-th subdata is expressed by $a_k$, and a dispersion coefficient is expressed by $\sigma_k$, the calculation result is represented by following equation (2).

[Eq. 2]

$$v = \begin{bmatrix} a_1 \cdot u_1 + \sigma_1 \\ a_1 \cdot u_2 + \sigma_1 \\ a_2 \cdot u_3 + \sigma_2 \\ \vdots \\ a_d \cdot u_N + \sigma_d \end{bmatrix} \quad (2)$$

The dispersion coefficient $\sigma_k$ can use a sine wave, for example, which is represented by following equation (3). "A" in the following equation (3) is a predetermined amplitude value other than 0.

[Eq. 3]

$$\sigma_k = A \cdot \sin\frac{2\pi}{d}k \quad (k = 1, 2, \ldots, d) \quad (3)$$

The operator 14 generates data symbols based on the operation result, and transfers the generated data symbols to the transmitter 15. The transmitter 15 generates a transmission frame including the data symbols, and transmits the frame to another apparatus via the transmission/reception switch 36 and the antenna 10.

Figure 3A:
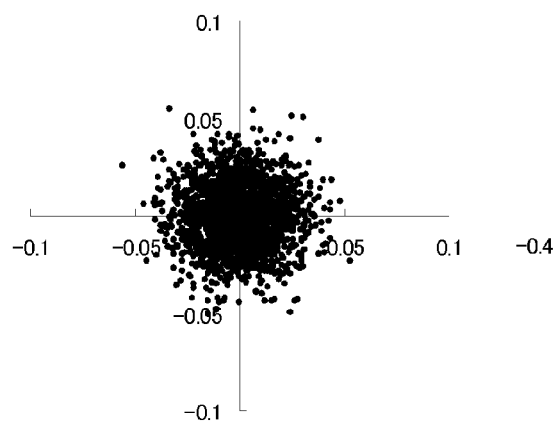
FIGS. 3A to 3D are drawings of signal point arrangements of simulated first data and an operation result of the first data.
Figure 3B:
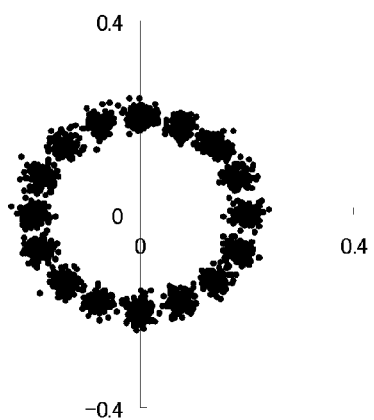
Figure 3C:
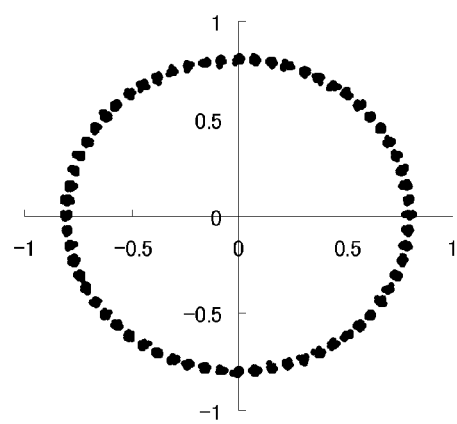
Figure 3D:
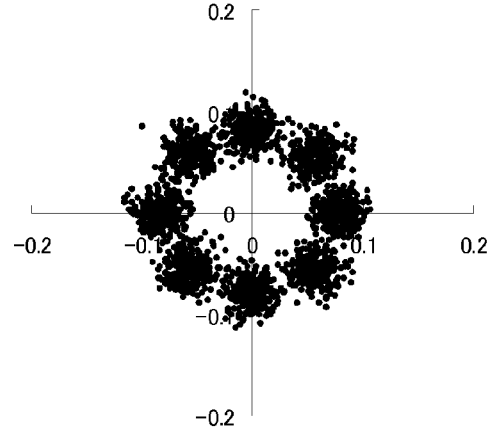

The principle of reducing the PAPR through the foregoing operation is illustrated. FIGS. 3A to 3D are drawings of signal point arrangements of simulated first data and an operation result of the first data. The drawings of signal point arrangements represent views in which elements of the first data or the operation result of the first data are plotted on a complex plane so that one element corresponds to one signal point, the complex plane having a horizontal axis as a real axis and a vertical axis as an imaginary axis. Here, the first data is generated where the FFT size is set to 2048, QPSK is used as the predetermined modulation scheme, and the random signal is used. FIG. 3A is a drawing of a signal point arrangement of the first data. FIG. 3B is a drawing of a signal point arrangement of the operation result which is applied using the above-described operation to first data, where the number of pieces of subdata is 16, the amplitude coefficients for all subdata are 0.9, and the amplitude value A of the dispersion coefficients represented by the above-described equation (3) for respective pieces of subdata is 0.2. FIG. 3C is a drawing of a signal point arrangement of the operation result which is applied using the above-described operation to first data, where the number of pieces of subdata is 64, the amplitude coefficients for all subdata are 0.5, and the amplitude value A of the dispersion coefficients represented by the above-described equation (3) for respective pieces of subdata is 0.8. FIG. 3D is a drawing of a signal point arrangement of the operation result which is applied using the above-described operation to first data, where the number of pieces of subdata is 8, the amplitude coefficients for all subdata are 0.8, and the amplitude value A of the dispersion coefficients represented by the above-described equation (3) for respective pieces of subdata is 0.08.

The PAPR of the data symbols generated from the data presented by FIG. 3A is 9.01 dB, whereas the PAPRs are 1.87 dB for FIG. 3B, 0.29 dB for FIG. 3C, and 3.64 dB for FIG. 3D, respectively. In any cases of the operation results that are applied using the above-described operation to the first data presented in FIG. 3B, FIG. 3C and FIG. 3D, the PAPRs were reduced as compared to those in the related art. Therefore, applying the above-described operation using the predetermined amplitude coefficients and dispersion coefficients allows a reduction of the PAPR of data symbols.

The processing on the reception side will be described below. The receiver 35 receives a transmission frame via the antenna 10 and the transmission/reception switch 36. The receiver 35 extracts data symbols from the received transmission signal, and transfers the symbols to the inverse operator 34. The inverse operator 34 performs serial-parallel conversion on the data symbols to generate a parallel signal. The inverse operator 34 subtracts from respective elements of the parallel signal, predetermined dispersion coefficients which are complex numbers defined for the respective elements, and further divides the subtraction results by predetermined amplitude coefficients which are real numbers defined for the respective elements. The dispersion coefficients and amplitude coefficients which are defined for the respective elements in the parallel signal used on the reception side are the same values as the dispersion coefficients and amplitude coefficients, which are defined for respective elements and are in the same positions in the first data used on the transmission side. Pieces of information on the dispersion coefficients and the amplitude coefficients defined for respective elements are held on the reception side beforehand.

Therefore, as with the transmission side, the amplitude coefficients and the dispersion coefficients on the reception side may have different values respectively for each element, and may have the same values respectively. Moreover, the parallel signal may be constituted so as to include a plurality pieces of subdata which includes a predetermined number of elements continuously located in the parallel signal. Furthermore, the inverse operator 34 may be constituted so as to, with respect to arbitrary subdata, subtract the same dispersion coefficient from each element included in the subdata, and to divide the result by the same amplitude coefficient. The number of pieces of subdata and the positions of parallel signal elements, which are included in the subdata, in the parallel signal are in agreement with the number of pieces of subdata used on the transmission side and the positions of the elements of the first data, which are included in the subdata, in the first data, respectively. Furthermore, the elements included in each subdata may differ in number, and may be the same in number.

The parallel signal r is represented by following equation (4). As with the above-described example, if the number of pieces of subdata is expressed by d, the number of elements included in each subdata is set to 2, an amplitude coefficient used for the calculation for elements of the k-th subdata is expressed by $a_k$, and a dispersion coefficient is expressed by $\sigma_k$, the calculation result is represented by following equation (5).

[Eq. 4]

$$r = \begin{bmatrix} r_1 \\ r_2 \\ r_3 \\ \vdots \\ r_N \end{bmatrix} \quad (4)$$

[Eq. 5]

$$s = \begin{bmatrix} \dfrac{r_1 - \sigma_1}{a_1} \\ \dfrac{r_2 - \sigma_1}{a_1} \\ \dfrac{r_3 - \sigma_2}{a_2} \\ \vdots \\ \dfrac{r_N - \sigma_d}{a_d} \end{bmatrix} \quad (5)$$

Since the parallel signal r is in agreement with the operation result by the operator 14 represented by the above-described equation (2), the calculation result by the inverse operator 34 is in agreement with the first data u.

The inverse operator 34 transfers the operation result to the FFT unit 33. The FFT unit performs an FFT on the operation result to generate a subcarrier modulation signal. The FFT unit 33 transfers the subcarrier modulation signal to the parallel-serial converter 32.

The parallel-serial converter 32 performs parallel-serial conversion on the subcarrier modulation signal to generate a serial signal, and transfers the signal to the demodulator 31. The demodulator 31 demodulates the serial signal in a predetermined demodulation scheme. For example, the demodulator 31 performs QPSK demodulation on the serial signal. Accordingly, the input signal modulated by the modulator 11 can be demodulated and output by the demodulator 31.

As described above, according to the communication apparatus 1 in the first embodiment of the present invention, it is possible to reduce the PAPR in OFDM communication by applying the predetermined operation to the first data which is generated by performing an IFFT on the subcarrier modulation signal based on the predetermined amplitude coefficients and dispersion coefficients. Moreover, it is possible to control the degree of reduction in PAPR as described later.

Second Embodiment

Figure 4:
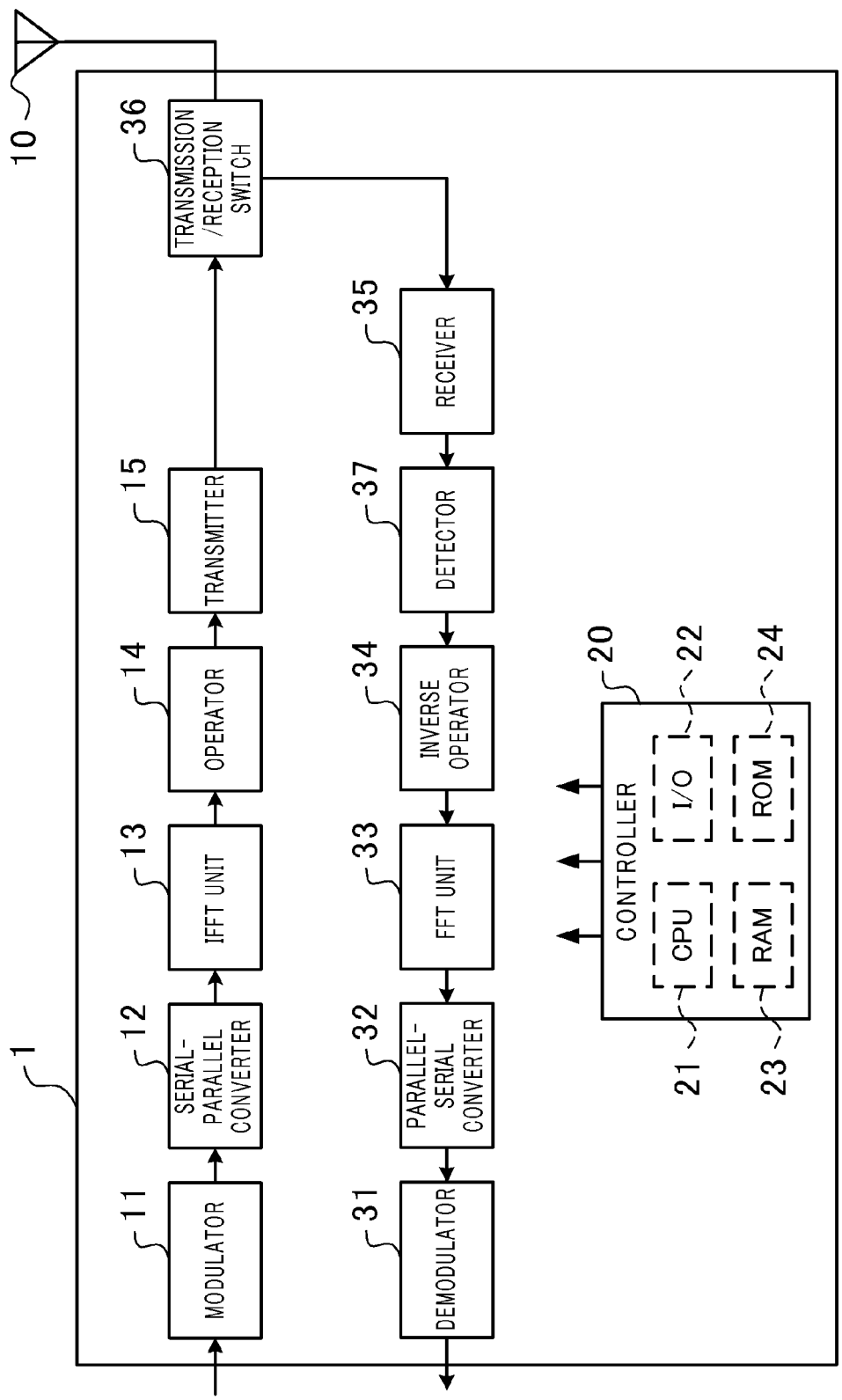
FIG. 4 is a block diagram illustrating a configuration example of a communication apparatus according to a second embodiment of the invention.

FIG. 4 is a block diagram illustrating a configuration example of a communication apparatus according to a second embodiment of the invention. Since the operation on the transmission side is the same as that of the first embodiment, different operations from the first embodiment on the reception side will be described using the communication apparatus 1 with the transmission function and the reception function which is illustrated in FIG. 4. In addition to the structure of the communication apparatus 1 in the first embodiment illustrated in FIG. 2, the communication apparatus 1 in the second embodiment includes a detector 37.

The receiver 35 receives a transmission frame via the antenna 10 and the transmission/reception switch 36. The receiver 35 extracts data symbols from the received transmission frame, and transfers the symbols to the detector 37. The detector 37 performs serial-parallel conversion on the data symbols to generate a parallel signal.

The detector 37 selects, from predetermined signal point arrangements, a signal point arrangement considered that it is in agreement with a signal point arrangement of the parallel signal, based on the signal point arrangement of the parallel signal generated from the data symbols which are located on a predetermined position, such as a position just behind a preamble, in the received transmission frame. Then, the detector 37 detects a dispersion coefficient and an amplitude coefficient which are defined for each element of the parallel signal used by the inverse operator 34, based on dispersion coefficients and amplitude coefficients which are defined for each signal point plotted on the selected signal point arrangement, and the position, in the parallel signal, of an element of the parallel signal corresponding to a signal point on the signal point arrangement.

Figure 5A:
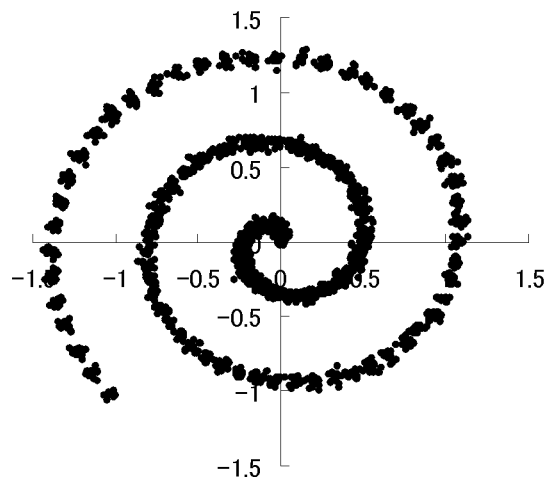
FIGS. 5A to 5C are drawings of signal point arrangements of parallel signals simulated with random signals.
Figure 5B:
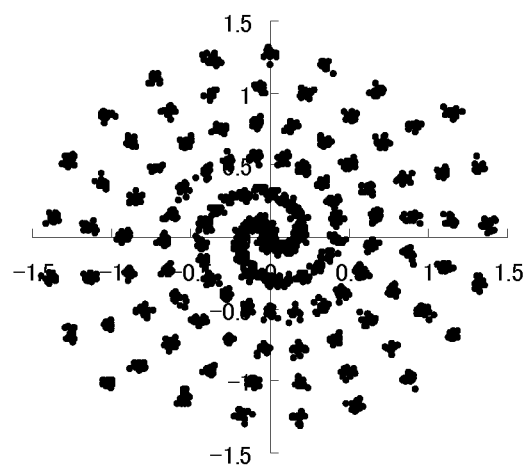
Figure 5C:
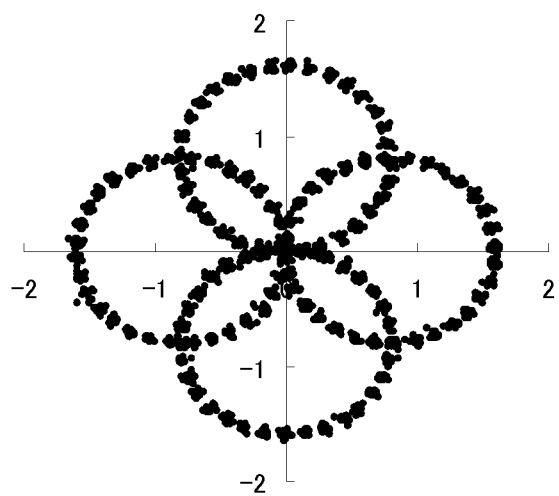

FIGS. 5A to 5C are drawings of signal point arrangements of parallel signals simulated with random signals. Simulations are performed where QPSK is used as the predetermined modulation scheme and the FFT size is set to 2048. In cases where, on the transmission side, the subdata is made to include the same number of elements, and the amplitude coefficients which have the same value and the dispersion coefficients which have the same amplitude value represented by the above-described equation (3) are used in all of subdata, distinctive signal point arrangements are obtained, such as, for example, as illustrated in FIG. 5A, FIG. 5B and FIG. 5C.

FIG. 5A and FIG. 5B are drawings of signal point arrangements of parallel signals in cases where the above-described calculation is applied to the first data which is based on random signals, where the number of pieces of subdata is 128 on transmission side, the amplitude coefficients are 1.5 for all subdata, and the amplitude value of the dispersion coefficients represented by the above-described equation (3) for respective pieces of subdata is 0.08. FIG. 5C is a signal point arrangement of a parallel signal in cases where the amplitude value of the dispersion coefficient is changed into 0.8.

For example, in cases where the signal point arrangement of the parallel signal generated from the data symbol located on the predetermined position in the received transmission frame is the signal point arrangement with a spiral pattern as illustrated in FIG. 5A, the detector 37 selects a signal point arrangement representing a spiral pattern in agreement with the signal point arrangement of the parallel signal from among the predetermined signal point arrangements. When the signal point arrangement has been selected, the detector 37 determines which signal point in the signal points distributed in the selected signal point arrangement corresponds to an element of the parallel signal generated from the data symbols located on positions other than the predetermined position in the received transmission frame. When the correspondence relation has been created between elements of the parallel signal and signal points in the signal point arrangement, the detector 37 considers that elements of the parallel signal corresponding to one signal point in the selected signal point arrangement is included in one piece of subdata, and detects dispersion coefficients and amplitude coefficients which are defined for each signal point in the signal point arrangement as the dispersion coefficients and the amplitude coefficients for each element of the parallel signal used by the inverse operator 34.

For example, in cases where an element of a first line and an element of a second line of the parallel signal are located within a predetermined range from an arbitrary signal point on the selected signal point arrangement when elements of the parallel signal are represented on the complex plane in the selected signal point arrangement, the detector 37 detects the dispersion coefficient $\sigma_1$ and the amplitude coefficient $a_1$ which are defined for the arbitrary signal point on the signal point arrangement as a dispersion coefficient and an amplitude coefficient to be used for the calculations for elements of a first line and a second line of the parallel signal. Alternatively, the detector 37 may consider that the nearest signal point from a position of an element of the parallel signal among the signal points distributed on the selected signal point arrangement is a signal point corresponding to the element, and may detect a dispersion coefficient and an amplitude coefficient which are defined for the signal point as a dispersion coefficient and an amplitude coefficient to be used for the calculations for the element. Moreover, in cases where the information regarding subdata in which each element of the parallel signal is included has been acquired on the reception side, the detector 37 may consider that the nearest signal point to an average value of the positions of the elements included in the subdata is a signal point corresponding to each element included in the subdata, and may detect a dispersion coefficient and an amplitude coefficient which are defined for the signal point as a dispersion coefficient and an amplitude coefficient to be used for the calculations for the elements included in the subdata.

The detector 37 transfers, to the inverse operator 34, the parallel signal which is generated by performing serial-parallel conversion on the data symbols other than the data symbol located on the predetermined position, the detected dispersion coefficient, and the detected amplitude coefficient. The inverse operator 34 subtracts, from each element of the parallel signal, the dispersion coefficient which is detected and defined for the element by the detector 37, and divides the subtraction result by the amplitude coefficient which is detected and defined for the element by the detector 37. The FFT unit 33, the parallel-serial converter 32 and the demodulator 31 operate as with the first embodiment.

As described above, according to the communication apparatus 1 in the second embodiment of the present invention, it is possible to detect the amplitude coefficient and the dispersion coefficient based on the signal point arrangement of the parallel signal generated from the data symbol located in the predetermined position in the received transmission frame, to apply the predetermined calculation to the parallel signal to generate the subcarrier modulation signal, and to perform the demodulation process. Accordingly, even if a communication apparatus on the reception side does not hold beforehand the information regarding the dispersion coefficients and the amplitude coefficients which have been used for the operation on the transmission side, it is possible to obtain the original input signal on the reception side from a transmitted signal which has been applied the calculation to reduce the PAPR.

Third Embodiment

Figure 6:
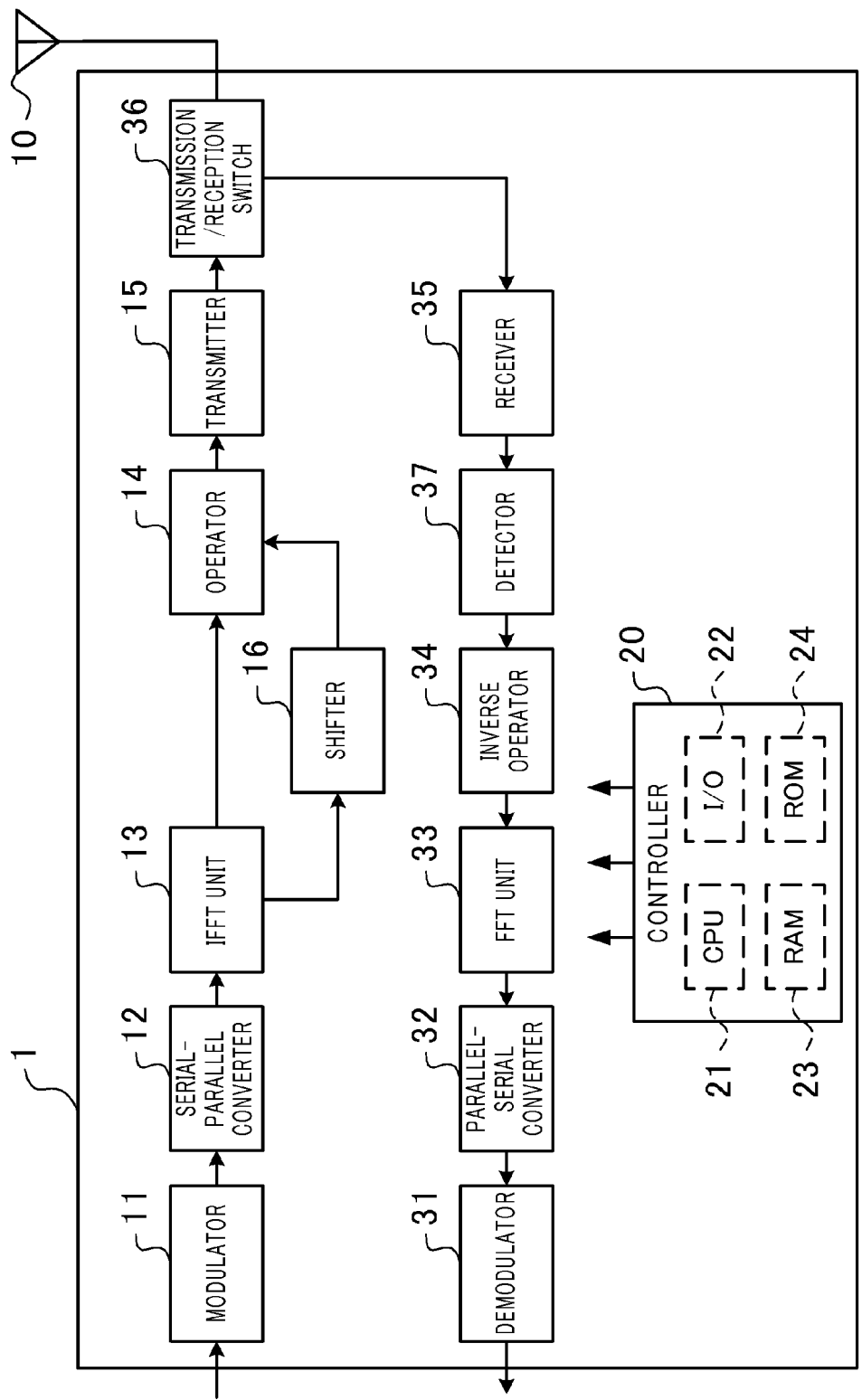
FIG. 6 is a block diagram illustrating a configuration example of a communication apparatus according to a third embodiment of the invention.

FIG. 6 is a block diagram illustrating a configuration example of a communication apparatus according to a third embodiment of the invention. In addition to the structure of the communication apparatus 1 in the second embodiment illustrated in FIG. 4, the communication apparatus 1 in the third embodiment includes a shifter 16. Hereinafter, operation different from the embodiments 1 and 2 will be described.

In cases where a predetermined number of continuous input signals are predetermined identical signals in which values are the same for respective elements of the subcarrier modulation signal generated from each of the predetermined number of input signals, the IFFT unit 13 transfers a plurality pieces of first data generated from the subcarrier modulation signal based on the predetermined number of input signals to the shifter 16. The predetermined number is a number defined beforehand, so that the amplitude coefficients and the dispersion coefficients defined for each subdata are detectable on the reception side, based on the number of pieces of subdata, and the amplitude coefficients and the dispersion coefficients which are defined for each subdata. It is needed one or more of predetermined numbers, the number of which is at least the number of combinations of the amplitude coefficients and the dispersion coefficients. That is, in cases where the combinations of the amplitude coefficients and the dispersion coefficients defined for each subdata are different for each subdata, the predetermined number is in agreement with the number of pieces of subdata. The predetermined identical signals are signals defined beforehand to be used for performing the demodulation process on the reception side, as the identical signals with 128-bit on a head of the input signal, for example.

As for the first data which is generated by applying the inverse fast Fourier transform on the subcarrier modulation signal in which each element has the same value, a value of one element is other than 0 and values of other elements are 0. Therefore, the IFFT unit 13 generates a predetermined pieces of first data in which only one element has a non-zero value, and transfers the predetermined pieces of generated first data to the shifter 16. The shifter 16 applies a data shift to the first data, so that the position of the element which has the non-zero value in each of the predetermined pieces of first data, that is, the element which has the maximum amplitude is the predetermined position in the predetermined subdata, and the positions of the element which has the maximum amplitude is included in different subdata among the predetermined pieces of first data.

For example, in cases where the FFT size is 16, the number of pieces of subdata is 4, and the amplitude coefficients and the dispersion coefficients defined for each subdata are different from each other, each part processes as follows. The modulator 11 modulates four input signals each of which has 32 bits among the predetermined identical signals which have 128 bits using QPSK, and generates four modulation signals. The serial-parallel converter 12 performs serial-parallel conversion on each of the four modulation signals and generates four subcarrier modulation signals. The IFFT unit 13 performs an IFFT on each of the four subcarrier modulation signals, and generates four pieces of first data. The shifter 16 shifts the four pieces of first data, for example, 0 times, 4 times, 8 times, and 12 times, respectively, and transfers the shifted first data to the operator 14.

The operator 14 applies the same operation as the embodiments 1 and 2 to the shifted first data, and transfers data symbols based on the shifted first data to the transmitter 15. The transmitter 15 transmits a transmission frame which includes the data symbols in the predetermined position, such as the position just behind the preamble. The following input signals are applied using the same process as the embodiments 1 and 2. As described above, in the third embodiment, the data generated on the transmission side from the input signals which are the predetermined identical signals is applied using the same operation as the operation to arbitrary input signals which should be transmitted. A communication apparatus on the reception side can acquire the information regarding the calculation applied to the input signal from the data just behind the preamble of the received transmission frame.

The processing on the reception side will be described below. When the transmission frame generated from the first data applied the data shift is received via the antenna 10 and the transmission/reception switch 36, the receiver 35 extracts data symbols from the received transmission frame, and transfers the symbols to the detector 37. The detector 37 performs serial-parallel conversion on the data symbols to generate parallel signals.

The detector 37 detects the amplitude coefficients and the dispersion coefficients based on the distribution on the complex plane of elements of the parallel signals, which is generated from the data symbols located on a predetermined position, such as a position just behind a preamble, in the received transmission frame. These parallel signals are generated by shifting predetermined pieces of first data, which are generated from certain identical signals on the transmission side, the number of times that are different between the respective pieces of first data. Therefore, there are a predetermined number of parallel signals, as with the first data. Moreover, when the elements of the parallel signals are expressed on a complex plane, the signal points of the elements, which have the maximum amplitude and have been shifted, for a predetermined number of parallel signals are plotted in different positions each other. On the other hand, the signal points of other elements, which have not been shifted, for a predetermined number of parallel signals are plotted in the same position.

The detector 37 detects a distance between, among signal points on the complex plane corresponding to elements of a predetermined number of parallel signals, a signal point among signal points which are located on different positions for the parallel signals and an equivalent signal point which is on the same position regardless of the parallel signals corresponding to the signal point, as an amplitude coefficient to be defined for subdata which includes an element of the parallel signals corresponding to the equivalent signal point which is on the same position regardless of the parallel signals. Moreover, the detector 37 detects a complex number which represents a difference between the equivalent signal point which is on the same position regardless of the parallel signals and the origin of the complex plane, as a dispersion coefficient to be defined for subdata which includes an element of the parallel signals corresponding to the equivalent signal point which are on the same position regardless of the parallel signals. The element of the parallel signals corresponding to the signal point which is on different position for the parallel signals, and the element of the parallel signals corresponding to the signal point which is on the same position regardless of the parallel signals corresponding to the signal point, are included in the same subdata. That is, the detector 37 calculates the distance between the signal points of two elements included in the same subdata, among a plurality pieces of subdata included in the parallel signals, as the amplitude coefficient. As for the information on whether or not two elements are included in the same subdata, since the elements of subdata are continuous elements in the parallel signals, it can be distinguished based on the position relationship of the two elements in the parallel signals.

Figure 7A:
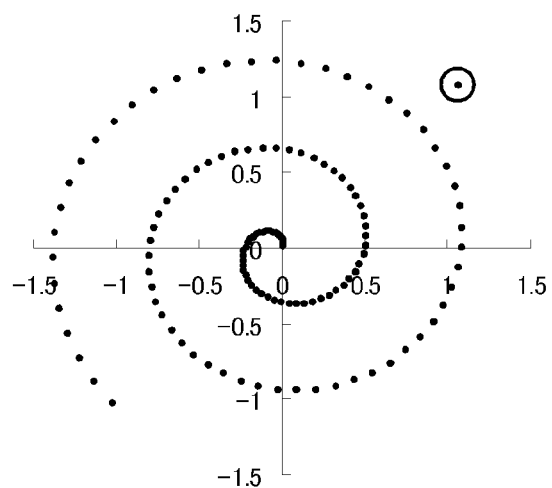
FIGS. 7A to 7C are drawings of signal point arrangements of parallel signals simulated with identical signals.
Figure 7B:
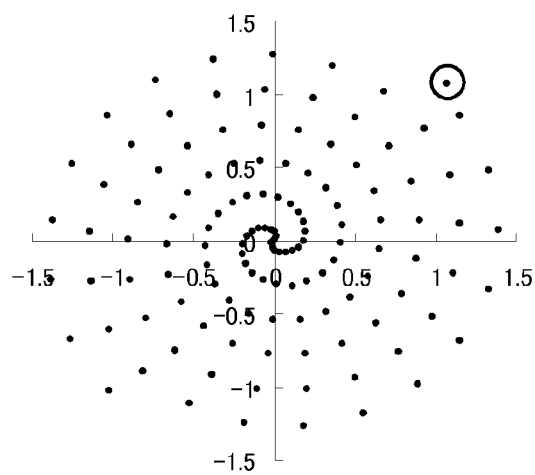
Figure 7C:
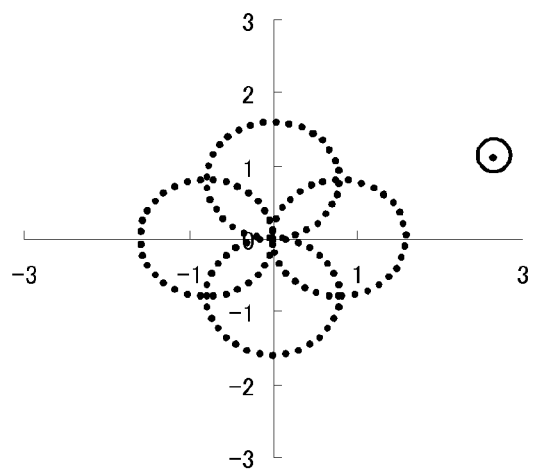

FIGS. 7A to 7C are drawings of signal point arrangements of parallel signals simulated with identical signals. FIG. 7A and FIG. 7B are drawings of signal point arrangements of parallel signals in cases where the above-described calculation is applied to the first data which is based on identical signals, where the number of pieces of subdata is 128 on the transmission side, the amplitude coefficients are 1.5 for all subdata, and the amplitude value of the dispersion coefficients represented by the above-described equation (3) for respective pieces of subdata is 0.08. FIG. 7C is a signal point arrangement of a parallel signal in cases where the amplitude value of the dispersion coefficient is changed into 0.8. At the transmission side, the operator 14 applies a calculation to each element of the first data so that a signal point arrangement of the calculation result of the first data generated from the certain identical signal has a characteristic shape as illustrated in FIGS. 7A to 7C. On the other hand, at the reception side, each of elements of a predetermined number of parallel signals is plotted on a complex plane to reproduce the signal point arrangement based on the calculation applied at the transmission side. An encircled point in each drawing is an element having the greatest amplitude, and corresponds to the element to which the data shift is applied at the transmission side. Therefore, the positions of the encircled points are different between the parallel signals. On the other hand, since other points correspond to the elements to which the data shift is not applied, the positions of the points do not differ between the parallel signals. At the reception side, the signal point arrangements generated from a predetermined number of parallel signals respectively are compared to distinguish the signal points which are different in position for the parallel signals and the signal points which are the same in position.

The detector 37 calculates the complex numbers representing the differences between the signal points on the complex plane and the origin of the complex plane, as the dispersion coefficients for respective signal points arranged on the complex plane. Moreover, the detector 37 calculates the real values representing distances between the signal points on the complex plane and the signal points which are different in position for the parallel signals, as the amplitude coefficients for respective signal points arranged on the complex plane. When the dispersion coefficients and the amplitude coefficients have been calculated, the detector 37 considers that the element corresponding to the certain signal point on the complex plane, among the elements of the parallel signals generated from the data symbols which are in positions other than a predetermined position in the received transmission frame, is included in one subdata. The detector 37 detects the dispersion coefficients and the amplitude coefficients which are calculated for respective signal points on the complex plane, as the dispersion coefficients and amplitude coefficients of respective elements of the subdata corresponding to the signal points, which are used in the inverse operator 34.

For example, it is assumed that the difference between the signal point on the complex plane corresponding to the element of a first line of the parallel signal, which is generated from the data symbol in a position other than a predetermined position in the received transmission frame, and the origin of the complex plane is represented by $\sigma_1$, and the distance between the signal point on the complex plane and the point which are different in position for the parallel signals is represented by $a_1$. In this case, the detector 37 detects $\sigma_1$ and $a_1$ as the dispersion coefficient and the amplitude coefficient of the subdata including the element of a first line of the parallel signal, respectively, and sets the detected dispersion coefficient and the detected amplitude coefficient for each element of the subdata.

The detector 37 transfers, to the inverse operator 34, the parallel signal which is generated by performing serial-parallel conversion on the data symbols other than the data symbols located on the predetermined position, the detected dispersion coefficient, and the detected amplitude coefficient. The inverse operator 34 subtracts, from each element of the parallel signals, the dispersion coefficient, which is detected by the detector 37 and is defined for the subdata including the element, and divides the result by the amplitude coefficient which is detected by the detector 37 and is defined for the subdata including the element. The FFT unit 33, the parallel-serial converter 32 and the demodulator 31 operate as with the first embodiment.

As described above, according to the communication apparatus 1 in the third embodiment of the present invention, it is possible to detect the amplitude coefficient and the dispersion coefficient based on points on the complex plane corresponding to elements of the parallel signals generated from the data symbols located in the predetermined position in the received transmission frame, to apply the predetermined operation to the parallel signals to generate the subcarrier modulation signals, and to perform the demodulation process. Accordingly, even if a communication apparatus on the reception side does not hold beforehand the information regarding the dispersion coefficients and the amplitude coefficients which have been used for the operation on the transmission side, it is possible to obtain the original input signal on the reception side from a transmitted signal which has been applied the calculation to reduce the PAPR.

Specific Examples

Next, the advantages of the embodiment of the invention will be described based on the results of simulation. Using a random signal as an input signal, generation of data symbols and repeating calculation of the PAPR according to the related art and the first embodiment were simulated. The PAPR characteristics according to the related art were compared with the PAPR characteristics according to the first embodiment with QPSK used as the modulation scheme and the FFT size being 2048. The related art concerns a method of generating data symbols from a subcarrier modulation signal without performing the foregoing operations. For the first embodiment, the simulations are performed in which the amplitude values of the amplitude coefficients and the dispersion coefficients are changed, where the number of subdata is 16, the number of elements included in each subdata is the same, the amplitude coefficients are the same value in all of the subdata, and the amplitude values A of the dispersion coefficients of respective pieces of subdata represented by the above-described equation (3) are the same value.

Figure 8:
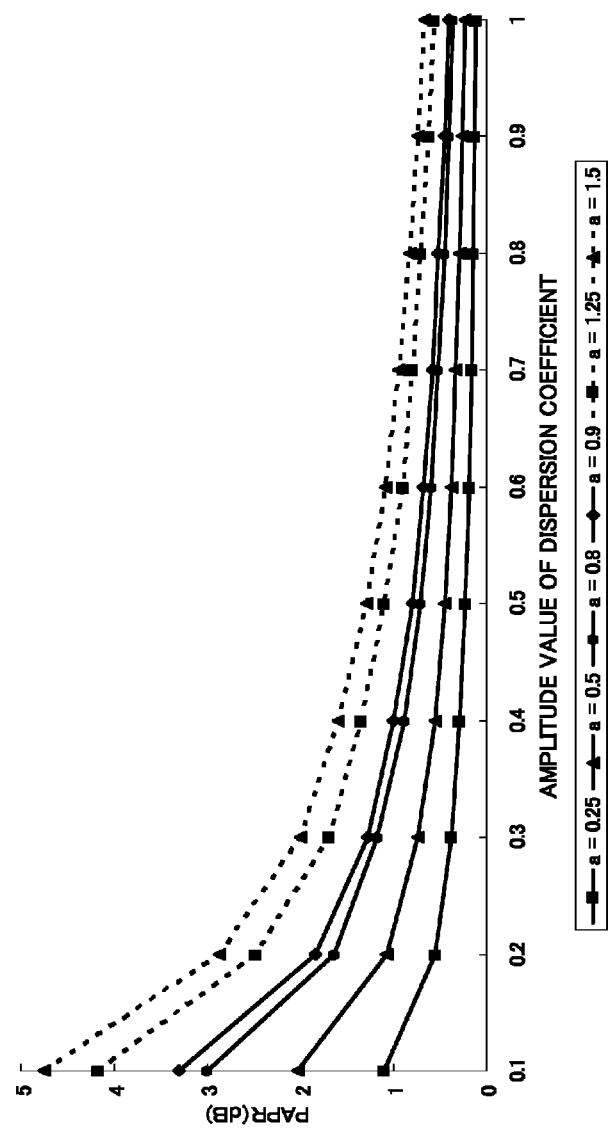
FIG. 8 is a diagram illustrating a relationship of an amplitude coefficient, a dispersion coefficient, and PAPR in a simulation.

The average value of the simulated PAPRs was 9.0 dB according to the related art. FIG. 8 is a diagram illustrating a relationship of the amplitude coefficient, the dispersion coefficient, and PAPR in the simulation. The abscissa represents an amplitude value of the dispersion coefficient, and the ordinate represents the PAPR (unit: dB). A graphical representation is provided for the relationships between the amplitude values of the dispersion coefficient and the PAPR, with the changing of the of amplitude coefficients.

A case where the amplitude coefficient is set to 0.25 is illustrated by a graph with a solid-line on which the plotting points are represented by squares, a case where the amplitude coefficient is set to 0.5 is illustrated by a graph with a solid-line on which the plotting points are represented by triangles, a case where the amplitude coefficient is set to 0.8 is illustrated by a graph with a solid-line on which the plotting points are represented by circles, a case where the amplitude coefficient is set to 0.9 is illustrated by a graph with a solid-line on which the plotting points are represented by lozenges, a case where the amplitude coefficient is set to 1.25 is illustrated by a graph with a dotted-line on which the plotting points are represented by squares, and a case where the amplitude coefficient is set to 1.5 is illustrated by a graph with a dotted-line on which the plotting points are represented by triangles.

As illustrated, the PAPR was lowered as the amplitude coefficient decreased, and the PAPR was lowered as amplitude value of the dispersion coefficient increased. Since the variation in amplitude is suppressed by making the amplitude coefficient small, the PAPR is lowered. Moreover, the point on the complex plane moves onto the circumference from a center part by making the amplitude value of the dispersion coefficient large. Thus, phases do not overlap, and the PAPR is lowered. Although the number of pieces of subdata was changed so that each pieces of subdata includes the same number of elements, a relationship was not found between the number of pieces of subdata and the decreasing amount of the PAPR.

Next, the CCDF (Complementary Cumulative Distribution Function) of the PAPR, i.e., the characteristic of the probability of occurrence of the PAPR, according to the related art was compared with the CCDF of the PAPR according to the first embodiment. The data symbols are generated where QPSK is used as the predetermined modulation scheme, the FFT size is set to 2048, and the random signal is used as the input signal. For the first embodiment, the data symbols are generated from first data by applying an operation represented by the signal point arrangements illustrated in the above-described FIG. 3D, that is, by applying the calculation in which the number of pieces of subdata is set to 8, the amplitude coefficients defined for each subdata are set to 0.8, and the amplitude values A of the dispersion coefficient is set to 0.08.

Figure 9:
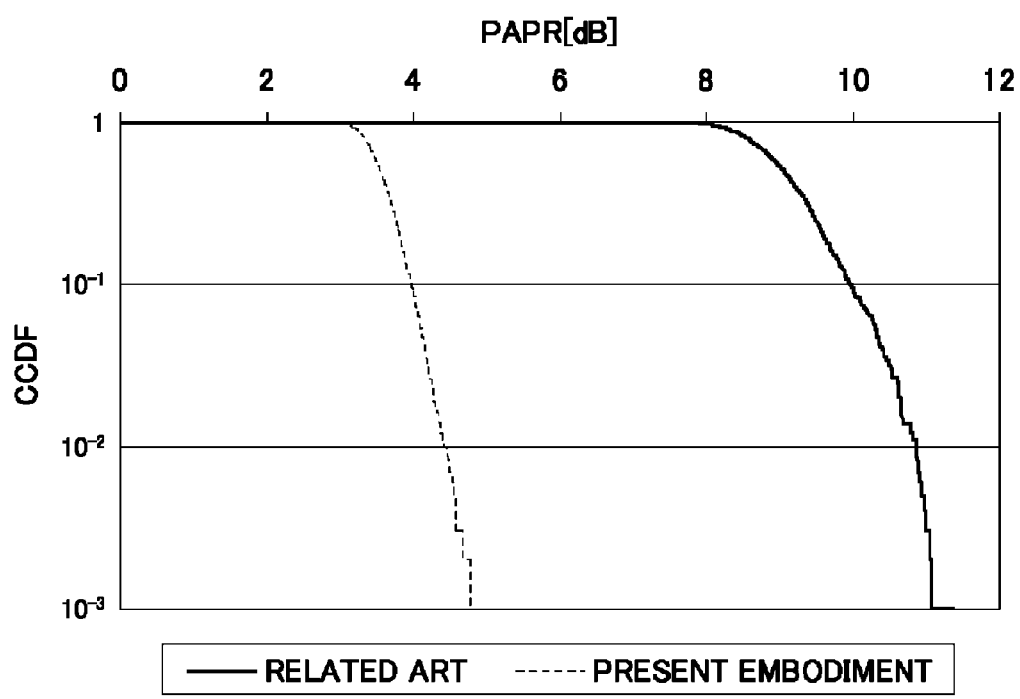
FIG. 9 is a diagram illustrating simulated CCDF characteristics of PAPRs of data symbols.

FIG. 9 is a diagram illustrating simulated CCDF characteristics of PAPRs of data symbols. The abscissa represents the PAPR (unit: dB), and the ordinate represents the CCDF of the PAPR. A solid-line graph represents the CCDF characteristic of the PAPR according to the related art. A dotted-line graph represents the CCDF characteristic of the PAPR according to the first embodiment. Within the illustrated range, the PAPR according to the first embodiment of the invention was reduced as compared with the PAPR according to the related art.

Figure 10:
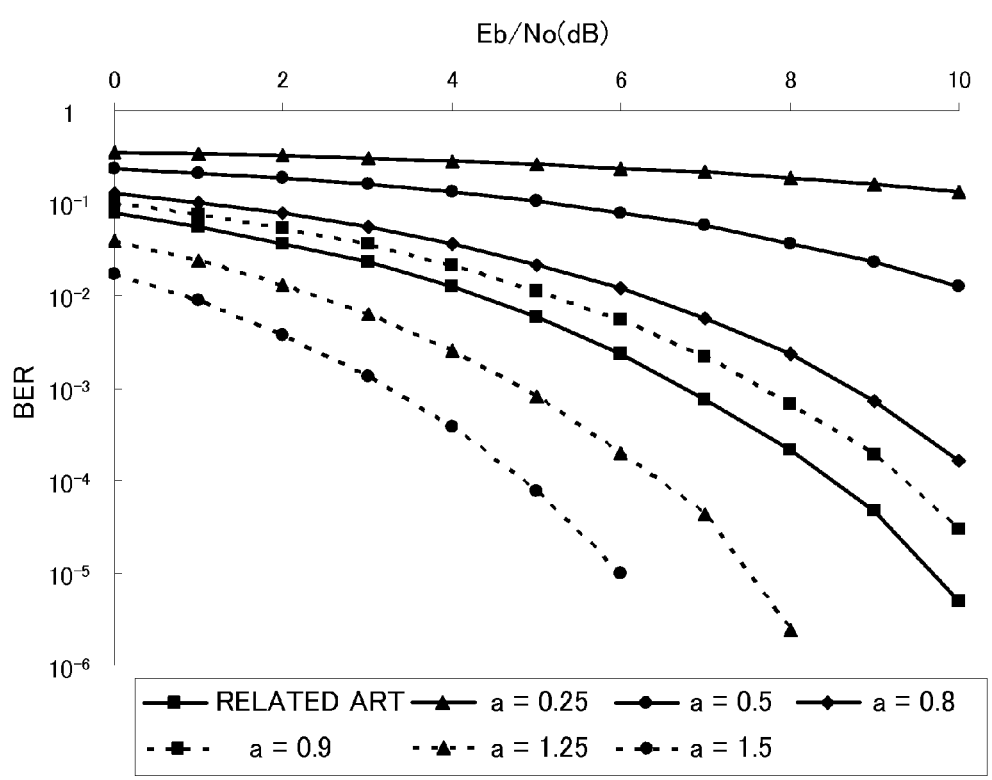
FIG. 10 is a diagram showing simulated BER characteristics.

Next, simulations regarding BER are performed. FIG. 10 is a diagram showing simulated BER characteristics. The abscissa represents the Eb/No (Energy per Bit to NOise power spectral density ratio), and the ordinate represents the BER. The unit of Eb/No is dB. The above-described simulations are performed where the dispersion coefficients are fixed, and the amplitude coefficients are changed.

A solid-line graph showing the plot points by squares represents the BER according to the related art. A solid-line graph showing the plot points by triangles represents the BER according to the first embodiment with the amplitude coefficient being set to 0.25. A solid-line graph showing the plot points by circles represents the BER according to the first embodiment with the amplitude coefficient being set to 0.5. A solid-line graph showing the plot points by lozenges represents the BER according to the first embodiment with the amplitude coefficient being set to 0.8. A dotted-line graph showing the plot points by squares represents the BER according to the first embodiment with the amplitude coefficient being set to 0.9. A dotted-line graph showing the plot points by triangles represents the BER according to the first embodiment with the amplitude coefficient being set to 1.25. A dotted-line graph showing the plot points by circles represents the BER according to the first embodiment with the amplitude coefficient being set to 1.5.

As illustrated, in cases where the amplitude values were set to 0.25, 0.5, 0.8, and 0.9 respectively, BERs were deteriorated in comparison with that of the related art, respectively. On the other hand, as illustrated, in cases where the amplitude coefficients were set to 1.25 and 1.5 respectively, BERs were improved in comparison with that of the related art, respectively.

Figure 11A:
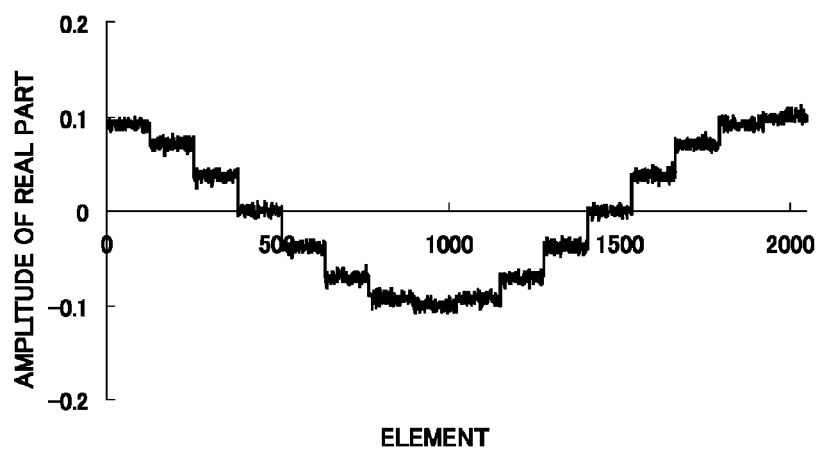
FIGS. 11A and 11B are diagrams illustrating change in amplitude of elements of first data in a simulation.
Figure 11B:
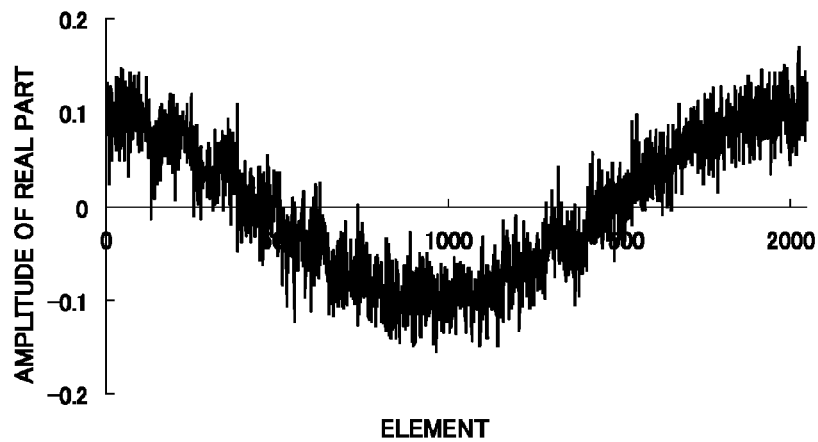

FIG. 11A and FIG. 11B are diagrams illustrating change in amplitude of elements of first data in a simulation. The abscissa represents the element, and the ordinate represents the amplitude value of the real part. FIG. 11A illustrates the amplitude value of the element of the first data in a case of performing the above-described simulation for a certain random signal, in which the amplitude coefficient was set to 0.25, and the amplitude value of the dispersion coefficient represented by the above-described equation (3) was set to 0.1. FIG. 11B illustrates the amplitude value of the element of the first data in a case of performing similar simulation in which the amplitude coefficient was changed into 1.5.

Since data is lost among noise when the amplitude coefficients are made small, an S/N ratio (Signal-to-Noise Ratio) is lowered and BER deteriorates. On the other hand, when the amplitude coefficients are made large, the S/N ratio becomes large and BER improves. Even if the dispersion coefficient and the number of pieces of subdata were changed, no change was recognized in BER. Further, the BER can be improved by increasing the transmission power.

From the above-described simulations, it is confirmed that the PAPR can be lowered in the present embodiment by applying a predetermined calculation to each element of the first data which is generated by subjecting the subcarrier modulation signals to an IFFT, using predetermined amplitude coefficients and predetermined dispersion coefficients, and it is possible to control a degree of reduction in PAPR by changing the amplitude coefficients and the dispersion coefficients.

The modes of the invention are not limited to the foregoing embodiments. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns individual pieces of data in the parallel signal to subcarrier signals, and then the modulator 11 modulates the individual pieces of data in the parallel signal by a predetermined modulation scheme. In this case, the demodulation process is carried out on the reception side with the layout order of the demodulator 31 and the parallel-serial converter 32 being changed.

The IFFT unit 13 may be configured so as to perform an IDFT instead of an IFFT, and the FFT unit 33 may be configured so as to perform a DFT instead of an FFT.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
 a modulator that modulates an input signal using a predetermined modulation scheme, and assigns the modulated input signal to subcarriers with frequency components orthogonal to each other, thereby generating a subcarrier modulation signal;
 a first transformer that performs an inverse fast Fourier transformation on the subcarrier modulation signal to generate first data;
 an operator that multiplies respective elements of the first data by amplitude coefficients, and that further adds dispersion coefficients to the multiplication result, the amplitude coefficients being real numbers other than 0 defined for the respective elements, at least one of the amplitude coefficients having a value other than 1, the dispersion coefficients being complex numbers defined for the respective elements, and at least one of the dispersion coefficients having a value other than 0;
 a synthesizer that generates data symbols based on an operation result by the operator; and
 a transmitter that transmits a transmission frame including the data symbols.

2. The communication apparatus according to claim 1, wherein the first data includes a plurality pieces of subdata which includes a plurality of elements continuously located in the first data, and
 the operator multiplies the plurality of elements included in each of the plurality pieces of subdata by the amplitude coefficients which have a same value respectively, and adds the dispersion coefficients which have a same value to the multiplication result.

3. The communication apparatus according to claim 2, wherein each of the plurality pieces of subdata includes a same number of elements, and
 the dispersion coefficients are expressed by a sine wave, which has a predetermined amplitude value and a phase of which is a value obtained by dividing one cycle of the sine wave by a number of the plurality pieces of subdata and multiplying the result by a number indicating each of the plurality pieces of subdata.

4. The communication apparatus according to claim 1, further comprising:
 a shifter that, in cases where a predetermined number of continuous input signals are predetermined identical signals in which each element of a subcarrier modulation signal generated from each of the predetermined number of input signals is a same value, applies a data shift to a plurality pieces of first data generated from the predetermined number of input signals so that elements each of which has a maximum amplitude in each of the plurality pieces of first data are included in different subdata among the plurality pieces of first data,
 wherein
 the operator multiplies the plurality of elements, which are included in each of the plurality pieces of subdata included in each of the plurality pieces of first data which is shifted by the shifter, by the amplitude coefficients which have a same value respectively, and adds the dispersion coefficients which have a same value to the multiplication result,
 the synthesizer generates data symbols based on an operation result by the operator, and
 the transmitter transmits a transmission frame including the data symbols in a predetermined position.

5. The communication apparatus of claim 1 further comprising:
 a receiver that receives a transmission frame including data symbols;
 a serial-parallel converter that performs serial-parallel conversion on the data symbols to generate a parallel signal;

an inverse operator that subtracts, from respective elements of the parallel signal, dispersion coefficients which are complex numbers defined for the respective elements, and divides the result by amplitude coefficients which are real numbers defined for the respective elements;

a second transformer that performs a fast Fourier transformation on an operation result by the inverse operator to generate a subcarrier modulation signal; and a demodulator that demodulates the subcarrier modulation signal by a predetermined demodulation scheme.

6. The communication apparatus according to claim 5, wherein the parallel signal includes a plurality pieces of subdata which includes a plurality of elements continuously located in the parallel signal, and the inverse operator subtracts the dispersion coefficients which have a same value from the plurality of elements included in each of the plurality pieces of subdata respectively, and divides the subtraction result by the amplitude coefficients which have a same value.

7. The communication apparatus according to claim 6, wherein each of the plurality pieces of subdata includes a same number of elements, and the dispersion coefficients are expressed by a sine wave, which has a predetermined amplitude value and a phase of which is a value obtained by dividing one cycle of the sine wave by a number of the plurality pieces of subdata and multiplying the result by a number indicating each of the plurality pieces of subdata.

8. The communication apparatus according to claim 5, further comprising:

a first detector that selects, based on a signal point arrangement of the parallel signal generated from the data symbol located on a predetermined position in the transmission frame, a signal point arrangement corresponding to the signal point arrangement of the parallel signal from predetermined signal point arrangements, detects an amplitude coefficient and a dispersion coefficient which are defined for a signal point corresponding to each element of parallel signal generated from data symbols located on positions other than the predetermined position in the transmission frame among signal points in the selected signal point arrangement, and defines the detected amplitude coefficient and dispersion coefficient for the each element, wherein the inverse operator subtracts, from each element of the parallel signal, the dispersion coefficient which is detected and defined for the each element by the first detector, and divides the result by the amplitude coefficient which is detected and defined for the each element by the first detector.

9. The communication apparatus according to claim 6, wherein the receiver receives the transmission frame which includes data symbols in a predetermined position, the data symbols being generated by shifting a plurality pieces of first data by a predetermined number of times which are different in each first data, each of the plurality pieces of first data being generated by performing an inverse fast Fourier transformation on a subcarrier modulation signal each element of which has a same value, and by applying a predetermined operation, further comprising:

a second detector that detects, among signal points on a complex plane corresponding to elements of a predetermined number of parallel signals generated from the data symbols located on the predetermined position in the transmission frame, an amplitude coefficient based on a distance between an equivalent signal point which is located on a same position in the predetermined number of parallel signals and a signal point corresponding to the equivalent signal point among signal points which are located on different positions in the predetermined number of parallel signals, detects a dispersion coefficient based on a complex number which represents a difference between the equivalent signal point and an origin on the complex plane, and defines the detected amplitude coefficient and dispersion coefficient for each element of subdata corresponding to the equivalent signal point among the plurality pieces of subdata included in parallel signals generated from data symbols located on positions other than the predetermined position in the transmission frame;

wherein the inverse operator subtracts, from each element of the parallel signals, the dispersion coefficient which is detected and defined for the each element by the second detector, and divides the result by the amplitude coefficient which is detected and defined for the each element by the second detector.

10. A communication method that is executed by a communication apparatus communicating with another apparatus in orthogonal frequency-division multiplexing wireless communication, the communication method comprising:

a modulating step of modulating an input signal using a predetermined modulation scheme, and assigning the modulated input signal to subcarriers with frequency components orthogonal to each other, thereby generating a subcarrier modulation signal;

a first transformation step of performing an inverse fast Fourier transformation on the subcarrier modulation signal to generate first data;

an operation step of multiplying respective elements of the first data by amplitude coefficients, and further adding dispersion coefficients to the multiplication result, the amplitude coefficients being real numbers other than 0 defined for the respective elements, at least one of the amplitude coefficients having a value other than 1, the dispersion coefficients being complex numbers defined for the respective elements, and at least one of the dispersion coefficients having a value other than 0;

a synthesis step of generating data symbols based on an operation result by the operation step; and a transmission step of transmitting a transmission frame including the data symbols.

11. The communication method of claim 10 further comprising:

a receiving step of receiving a transmission frame including data symbols;

a serial-parallel conversion step of performing serial-parallel conversion on the data symbols to generate a parallel signal;

an inverse operation step of subtracting, from respective elements of the parallel signal, dispersion coefficients which are complex numbers defined for the respective elements, and dividing the result by amplitude coefficients which are real numbers defined for the respective elements;

a second transformation step of performing a fast Fourier transformation on an operation result by the inverse operation step to generate a subcarrier modulation signal; and a demodulation step of demodulating the subcarrier modulation signal by a predetermined demodulation scheme.

* * * * *